United States Patent [19]
Le Coquil et al.

[11] Patent Number: 5,353,145
[45] Date of Patent: Oct. 4, 1994

[54] OPTICAL DISTRIBUTOR

[75] Inventors: Emile Le Coquil; André Hamel, both of Lannion, France

[73] Assignee: France Telecom Etablissement Autonome de Droit Public, Paris, France

[21] Appl. No.: 973,759

[22] Filed: Nov. 9, 1992

[30] Foreign Application Priority Data

Nov. 19, 1991 [FR] France .................. 91 14227

[51] Int. Cl.$^5$ .................. H04J 14/08; H04B 10/02
[52] U.S. Cl. .................. 359/139; 359/120; 359/121; 359/123; 359/178
[58] Field of Search .............. 359/117, 120, 121, 123, 359/125, 128, 135, 139, 178

[56] References Cited

U.S. PATENT DOCUMENTS

| | | | |
|---|---|---|---|
| 4,873,681 | 10/1989 | Arthurs et al. | 359/123 |
| 5,005,167 | 4/1991 | Arthurs et al. | 359/135 |
| 5,105,292 | 4/1992 | Le Roy et al. | 359/117 |
| 5,175,640 | 12/1992 | Eng et al. | 359/135 |

FOREIGN PATENT DOCUMENTS

0092133 4/1988 Japan .................. 359/121

Primary Examiner—Richard E. Chilcot, Jr.
Assistant Examiner—Rafael Bacares
Attorney, Agent, or Firm—Oblon, Spivak, McClelland, Maier & Neustadt

[57] ABSTRACT

An optical distributor which comprises M inputs (M>1) each receiving signals. M modules (MT1 to MT4) are connected to the M inputs and each simultaneously process N consecutive signals (N>1). N optical couplers (CO1 to CO4) each having M inputs and 1 output are connected to one of the N outputs. A control means (G) controls the modules and enables the distributor to scramble the signals so that a given signal reaches a given output of the distributor. Each module electronically demultiplexes the N consecutive signals, time rearranges the demultiplexed signals in accordance with the output of the distributor imposed by the control means for each of these signals, transposes the latter into optical form at N different wavelengths and switches each transposed signal to the desired output of the distributor. Such a device finds particular application in optical telecommunication system.

20 Claims, 9 Drawing Sheets

OPTICAL DISTRIBUTOR

DESCRIPTION

1. Field of the Invention

The present invention relates to an optical distributor. It more particularly applies to the field of optical telecommunications.

2. Discussion of the Background

Distributors carrying out a time-based electronic switching are already known. However, they suffer from the disadvantages of being unsuitable for the high speed processing of information, they are not easily compatible with optical information transmission networks and with such distributors it is very difficult or even impossible to supply an information present at one input to all or part of the outputs.

SUMMARY OF THE INVENTION

The present invention aims at obviating these disadvantages by proposing an optical distributor using multicolor methods and which can be constructed so as to have a high capacity.

The optical distributor according to the invention utilizes optical switching and is more suitable for the high speed processing of information than the known distributors referred to hereinbefore and has a better compatibility than the latter with optical information transmission networks. Moreover, with a distributor according to the invention, it is possible to supply an information present at one input of said distributor to all or part of the distributor outputs.

More specifically, the present invention relates to an optical distributor, characterized in that it comprises:

M inputs, M being an integer at least equal to 1, each input receiving elementary signals, M processing modules respectively connected to the M inputs, each processing module having N outputs and simultaneously processing N consecutive elementary signals, N being an integer at least equal to 1, N outputs, N optical couplers, each having M inputs respectively associated with the M processing modules and an output connected to one of the N outputs of the distributor and control means, which control the processing modules and enable the distributor to scramble the elementary signals reaching the M inputs thereof, so that a given elementary signal reaches a given output of the distributor, and in that each processing module:

electronically demultiplexes the N consecutive elementary signals and thus supplies, in electrical form, N demultiplexed elementary signals, under the control of the control means rearranges on a time basis said N demultiplexed signals in accordance with the output of the distributor imposed by the control means for each of said N demultiplexed signals and also under the control of the control means, transposes the N demultiplexed signals in optical form at N different wavelengths from one another and switches each transposed signal to the desired output of the distributor.

The number N can be equal to the number M.

The distributor according to the invention can have a large capacity based on arrangements of processing modules using a limited number of optical wavelengths.

According to a first special embodiment of the optical distributor according to the invention, each processing module comprises:

electronic demultiplexing means having one input connected to the input of the distributor, which corresponds to said processing module, and N outputs, said demultiplexing means supplying respectively at their N outputs the N demultiplexed signals, reorganization means with N inputs respectively connected to the N outputs of the demultiplexing means, and to N outputs, said reorganization means being controlled by the control means and reorganizing on a time basis the N demultiplexed signals, N electrooptical converters, whose inputs respectively receive the N time reorganized signals and which respectively supply N optical signals, whose respective wavelengths differ from one another and switching means controlled by the control means and which switch each optical signal to the desired output of the distributor.

In the case of this first special embodiment, the switching means can comprise:

an intermediate optical coupler with N inputs, which respectively receive the N optical signals, and N outputs and N tunable optical filters, which are controlled by the control means, whose inputs are respectively connected to the outputs of the intermediate optical coupler and whose N outputs are respectively connected to the N inputs respectively belonging to the N optical output couplers, so that each processed elementary signal is switched to one of the outputs of the distributor.

In another variant of the first special embodiment, the switching means comprise:

an array of N×N optical switches, which are controlled by control means and which form N rows and N columns, each row having N of said series-connected optical switches and forming an optical line connected to the output of one of the electrooptical converters and N auxiliary optical couplers with N inputs and one output, the N inputs of each auxiliary optical coupler being respectively connected to the N optical switches of one of the N columns and the output of said auxiliary optical coupler is connected to one of the inputs of one of the output optical couplers of the distributor.

In this latter case, it is preferable that the switching means also comprise:

an intermediate optical coupler with N inputs, which respectively receive the N optical signals from the electrooptical converters, and one output and a wavelength demultiplexer with one input connected to the output of said intermediate optical coupler, and N outputs respectively connected to the N optical lines of the array of optical switches.

This is preferable for engineering reasons, because it simplifies the construction of the optical links between the different subarrays of the distributor.

In the case of the first special embodiment, the optical signals from the output optical couplers of the distributor can be directly transmitted by optical wave guides (e.g. optical fibers) if the influence of the chromatic dispersion does not disturb the transmission of the information.

In the opposite case, in order to obviate the disturbance due to chromatic dispersion, it is preferable for the distributor to also have:

N photodetectors, whose inputs are respectively connected to the outputs of the output optical couplers of the distributor and N auxiliary electrooptical converters, whose inputs are respectively connected to the outputs of the N photodetectors, the N outputs of the distributor being respectively connected to the outputs of said N auxiliary electrooptical converters, so that each output of the distributor supplies elementary signals, which are in optical form and have the same wavelength.

According to a second special embodiment of the distributor according to the invention, each processing module comprises:

electronic demultiplexing means having one input connected to the input of the distributor corresponding to said processing module, and N outputs, said demultiplexing means supplying respectively at their N outputs the N demultiplexed signals, reorganization means having N inputs respectively connected to the N outputs of the demultiplexing means, and with N outputs, said reorganization means being controlled by the control means and time reorganizing the N demultiplexed signals, N tunable electrooptical converters, whose inputs respectively receive the N time reorganized signals, which respectively supply N optical signals and which are controlled by the control means, an intermediate optical coupler with N inputs, which respectively receive the N optical signals, and N outputs and N optical filters, whose inputs are respectively connected to the outputs of the intermediate optical coupler, whose N outputs are respectively connected to N inputs respectively belonging to the N output optical couplers and which in each case only allow the passage of a single wavelength, the N wavelengths traversing said filters differing from one another, each processed elementary signal being in this way switched to one of the outputs of the distributor.

In a special embodiment of the distributor according to the invention, each input of said distributor receives elementary signals in optical form and is connected to the input of a photodetector, whose output is connected to the input of the corresponding processing module in order to supply the latter with the elementary signals in electrical form.

Finally, the optical distributor according to the present invention is able to operate in the synchronous transfer mode (STM) and in the asynchronous transfer mode (ATM).

Thus, in a special embodiment, each input of the distributor receives signals, which are synchronous transfer modules-N and which are designated STM-N, each processing module simultaneously processing the N order 1 synchronous transfer modules (STM-1) of each of the order N synchronous transfer modules.

In another special embodiment, each input of the distributor receives elementary signals organized in packet form and transmitted in the asynchronous transfer mode ATM, each processing module simultaneously processing N consecutive packets.

BRIEF DESCRIPTION OF THE DRAWINGS

The invention is described in greater detail hereinafter relative to non-limitative embodiments and with reference to the attached drawings, wherein.

DESCRIPTION OF THE PREFERRED EMBODIMENTS

Figure 1:
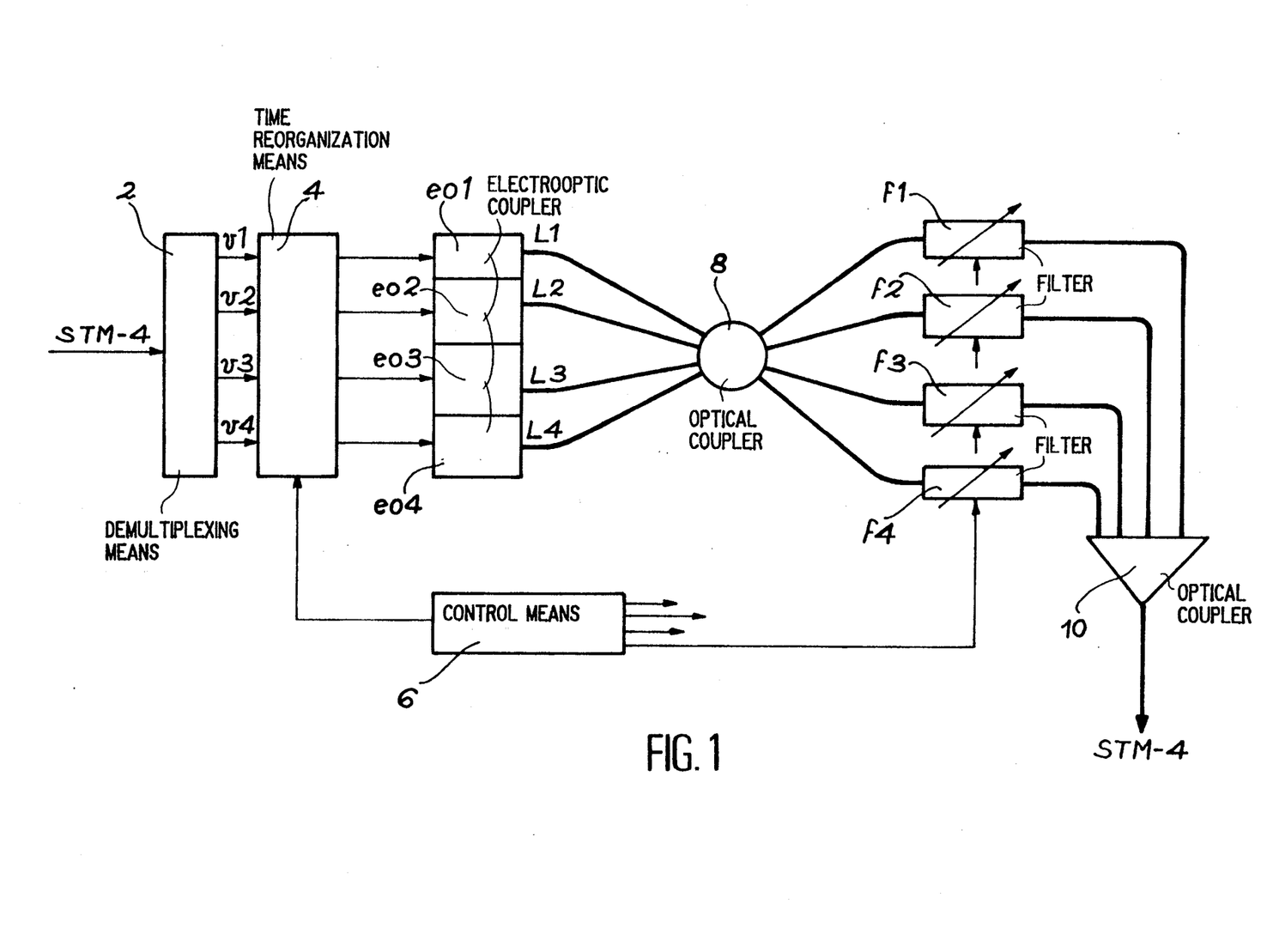
FIG. 1 shows a diagrammatic view of an optical distributor according to the invention having tunable optical filters, an input receiving signals or beams of type STM-N and an output, N being equal to 4 in the present embodiment.

FIG. 1 diagrammatically shows an optical distributor according to the invention having a single processing module. Thus, the distributor of FIG. 1 has an input at which appear the electrical signals of type STM-N, N being equal to 4 in the embodiment of FIG. 1.

With an incident signal STM-4, the distributor supplies at the output a signal STM-4 within which the distribution of the signals STM-1 of the incident signal STM-4 has been modified.

The distributor of FIG. 1 comprises electronic demultiplexing means 2, whose input receives the incident signals STM-4 and which respectively supplies on its four output channels v1, v2, v3 and v4 the four signals STM-1 of the incident signal STM-4.

The distributor of FIG. 1 also comprises time reorganization means 4, whose four inputs respectively receive said four demultiplexed signals STM-1. The distributor of FIG. 1 also comprises control means 6 for controlling the time reorganization means 4 so as to modify the time distribution of the demultiplexed signals STM-1.

The distributor of FIG. 1 also comprises four electrooptical converters eo1, eo2, eo3 and eo4, whose respective emission wavelengths L1, L2, L3 and L4 differ from one another and are respectively controlled by the time reorganized electrical signals from the reorganization means 4.

The distributor of FIG. 1 finally comprises an optical coupler 8 having four inputs and four outputs, four electrically tunable optical filters f1, f2, f3 and f4 controlled by the control means 6 and an optical coupler 10 having four inputs and an output also forming the output of the distributor of FIG. 1.

The four inputs of the coupler 8 respectively receive the optical signals supplied by the converters eo1 to eo4 and said four optical signals are present on each of the four outputs of the optical coupler 8. These four outputs of the coupler 8 are respectively connected to the inputs of the tunable filters f1 to f4. The outputs of these filters are respectively connected to the four inputs of the output optical coupler 10.

The modification of the distribution of the signals STM-1 within the incident signal STM-4 is carried out in the spectral range by spreading over four wavelengths L1 to L4 and in the time range with the aid of the control means 6.

It is pointed out that the control means 6 controls retrieving the data stored, decoding of the header of each signal STM-1, updating the new header and controlling the collision risk in the time range. Thus, the control means 6 analyzes the header of each signal STM-1 and modifies the content thereof in order to take account of the new destination.

After electronic demultiplexing and time rearrangement, the signals STM-1 are transposed into optical form.

In the embodiment shown, the wavelengths L1, L2, L3 and L4 are respectively associated with the ranks of the signals STM-1 in the incident signal STM-4. Consequently the wavelength L1 is allocated to the first signal STM-1 present on the first output v1 of the demultiplexer 2, the wavelength L2 is allocated to the second signal STM-1 present on the output v2 of said demultiplexer and so on.

Figure 2A:
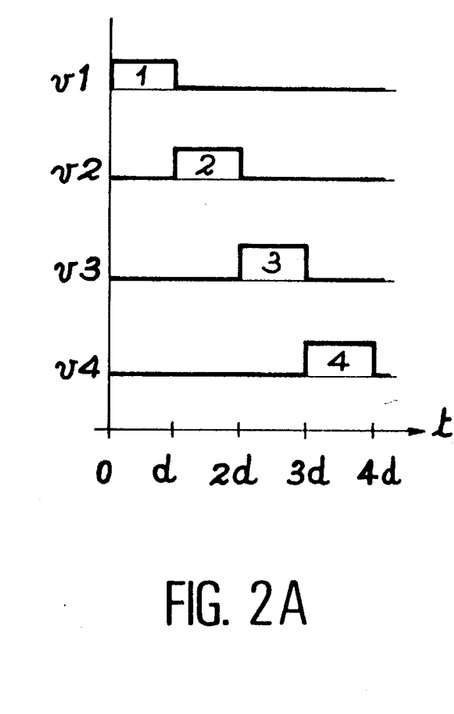
FIGS. 2A, 2B and 2C show the time distribution of the signals or frames of type STM-1 forming part of the signals STM-N, at different levels of the distributor shown in FIG. 1.

FIG. 2A shows the time distribution of the signals STM-1 (respectively numbered 1 to 4) at the output of the demultiplexer 2. In FIG. 2A, the time t is counted on an axis, whose origin O coincides with the start of the first signal STM-1, each of the signals STM-1 having the same duration d.

Figure 2B:
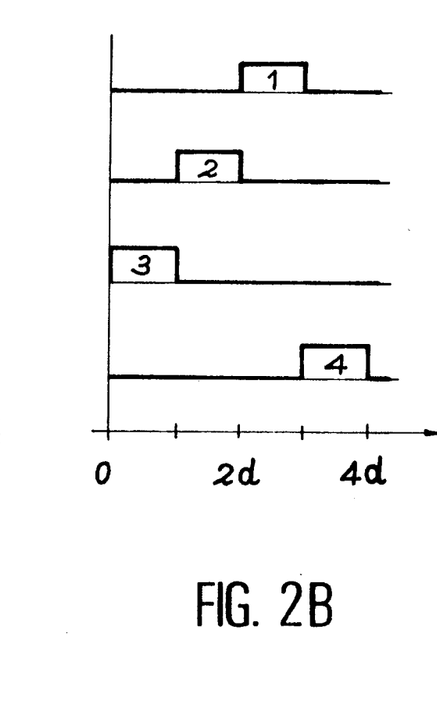

FIG. 2B shows an example of the rearrangement obtained at the output of the reorganization means 4, the STM-1 of rank 1 of the incident STM-4 passes to the time location of rank 3 of the new STM-4, while the STM-1 of rank 3 of the incident STM-4 occupies the time location of rank 1 of the new STM-4.

The rearranged signals STM-1 directly modulate the converters eo1 to eo4 of respective wavelengths L1 to L4.

Figure 2C:
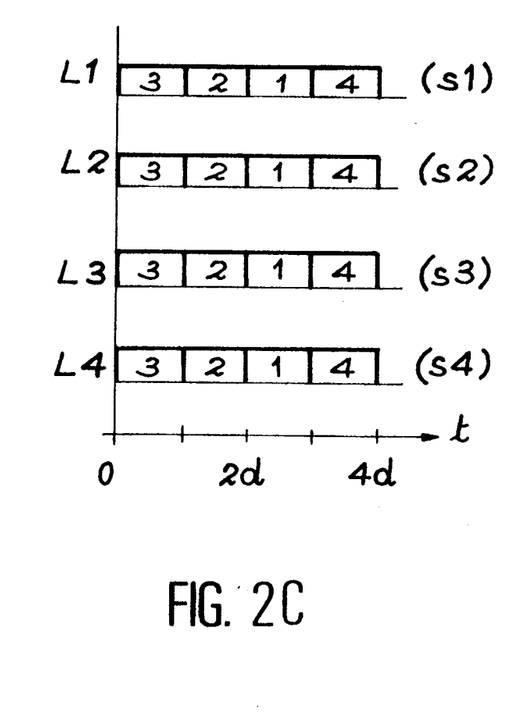

The resulting optical signals are mixed by the optical coupler 8 and the four outputs s1, s2, s3 and s4 thereof all receive the new signal STM-4, as indicated in FIG. 2C.

In the simple exemplified embodiment shown in FIG. 1, it is merely necessary for the control means 6 to control the electrically tunable optical filters in such a way that filter f1 successively permits the passage of wavelengths L3, L2, L1 and L4 and the other filters f2, f3, and f4 remain in the inoperative, in order to obtain, at the output of the optical coupler 10, the new STM-4.

Obviously other values of N are possible, e.g. the value 16, the incident signal then being a STM-16, but in this case it is necessary to use 16 different wavelengths.

Figure 3:
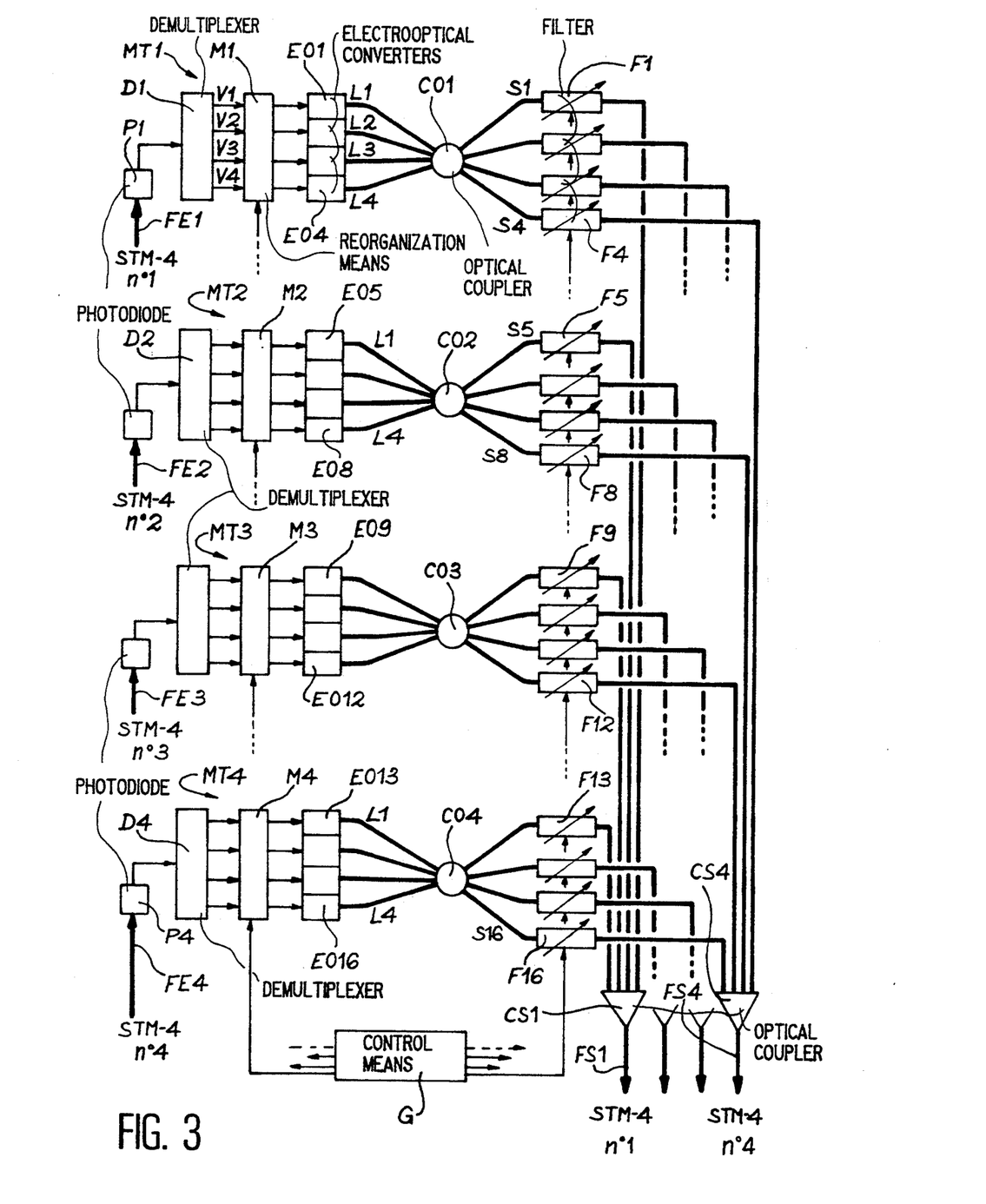
FIG. 3 shows a diagrammatic view of a special embodiment of the optical distributor according to the invention having tunable optical filters with M inputs, each receiving signals of STM-N type, and N outputs, M and N being equal to four in the embodiment shown.

FIG. 3 diagrammatically shows another distributor according to the invention having not one, but M processing modules, which are identical, M being an integer greater than 1.

In the embodiment shown in FIG. 3, the number M is equal to 4 and the processing modules respectively carry the references MT1, MT2, MT3 and MT4. These processing modules MT1 to MT4 respectively receive four signals STM-N, which are numbered 1 to 4, the number N being equal to 4 in the embodiment shown. Thus, each STM-4 is a sequence of four signals STM-1 and the distributor of FIG. 3 serves to scramble said STM-1.

This distributor has N outputs (four in the embodiment shown) on which the new STM-4, numbered 1 to 4 and resulting from said scrambling are available. In the embodiment shown, the input STM-4 and the output STM-4 are in optical form.

The input STM-4 reach the modules MT1 to MT4 by means of input optical fibers FE1, FE2, FE3 and FE4 and are converted into electrical form by photodiodes P1 to P4 before being processed in the modules MT1 to MT4.

Each processing module (MT1 to MT4) successively comprises the following:

an electronic demultiplexer (D1 to D4) having four output channels V1, V2, V3, V4 on which are respectively provided the four STM-1 of the incident STM-4 corresponding thereto, the first STM-1 present at the input of the demultiplexer passing out on channel number 1, the second on channel number 2, the third on channel number 3 and the fourth on channel number 4, the reorganization means (M1 to M4) receiving at the input the signals STM-1 present on the output channels of the demultiplexer and which are controlled by control means G in order to reorganize on a time basis said STM-1 carrying out time shifts of the latter in accordance with the control of the control means G, four electrooptical converters (EO1 to EO4 for the module MT1 ... EO13 to EO16 for the module MT4), which are controlled by the four signals of the reorganization means (M1 to M4) and which transpose said signals into optical form and supply on their respective outputs four signals, whose respective wavelengths L1 to L4 differ from one another, an optical coupler (CO1 to CO4) having four inputs, which respectively receive the signals of the four associated electrooptical converters and four outputs (designated S1 to S4 for the module MT1 ... S13 to S16 for the module MT4), four electrically tunable optical filters (F1 to F4 for the module MT1 ... F13 to F16 for the module MT4), which are controlled by the control means G, the input of each filter being connected to one of the outputs of the corresponding coupler, as can be seen in FIG. 3.

The distributor shown in FIG. 3 also comprises N output optical couplers CS1 to CS4 (N being equal to 4 in the embodiment shown). These couplers have four inputs and one output.

The respective outputs of said couplers CS1 to CS4 are connected to optical fibers FS1 to FS4, which constitute the outputs of the distributor of FIG. 3 and on which are respectively available the output STM-4 numbered 1 to 4.

As can be seen in FIG. 3, there is a one-to-one correspondence between the outputs of the filters F1 to F16 and the inputs of the couplers CS1 to CS4.

More specifically, the outputs of the filters F1, F5, F9 and F13 are respectively connected to the four inputs of the coupler CS1 and so on up to the filters F4, F8, F12 and F16, whose outputs are respectively connected to the four inputs of the coupler CS4.

The control means G controls the time rearrangement operations and also the tunable filters. Thus, the sigals STM-1 are distributed on a time and spectral basis.

It should be noted that the same information is transmitted on the four outputs of each coupler CO1 to CO4 at different wavelengths L1 to L4.

An explanation will be given hereinafter of the operation of the distributor of FIG. 3 with reference to FIGS.

Figure 4A:
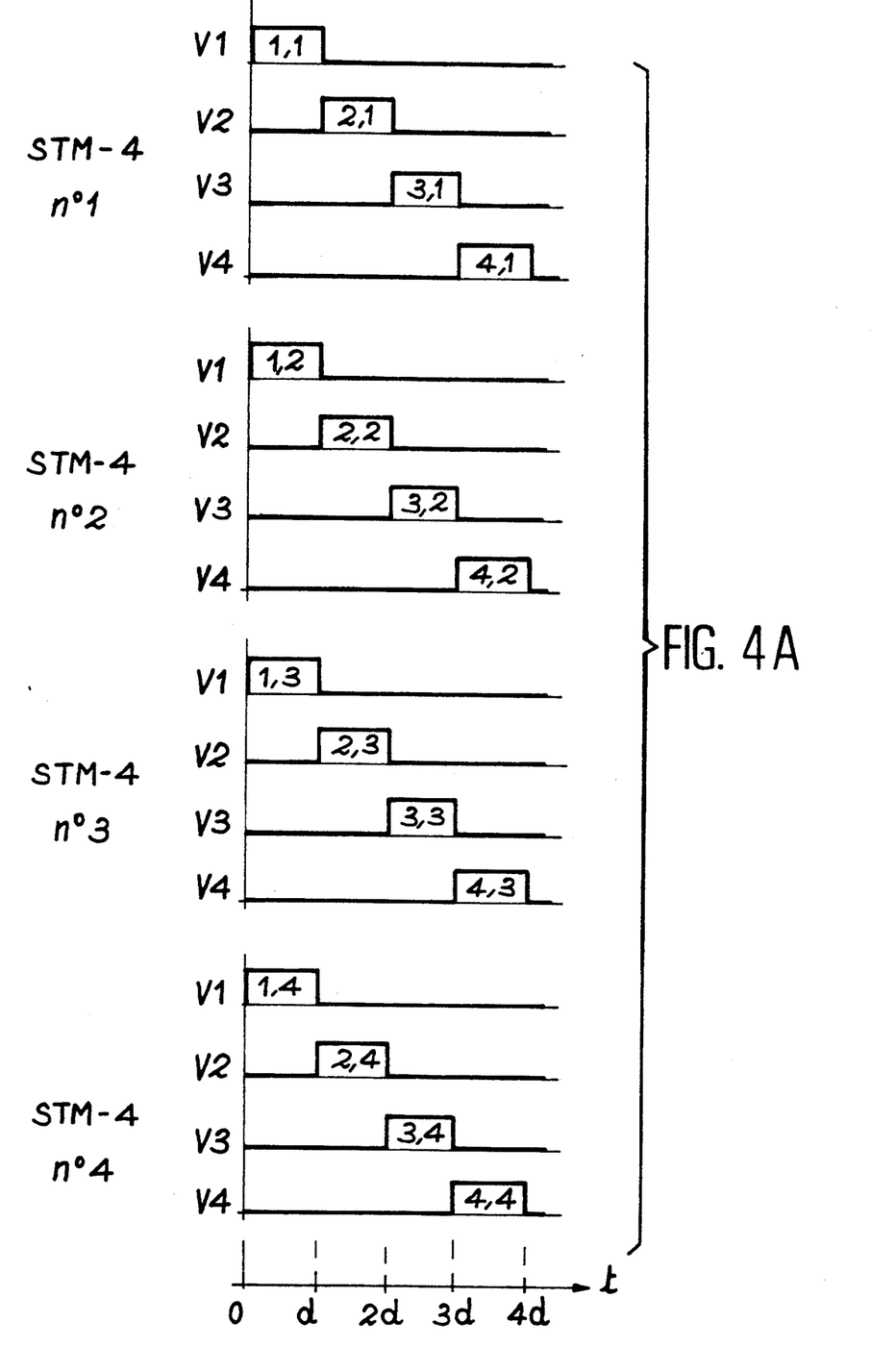
FIGS. 4A, 4B and 4C show the time distribution of the type STM-1 signals forming part of the STM-N signals, at different levels of the distributor shown in FIG. 3.
Figure 4B:
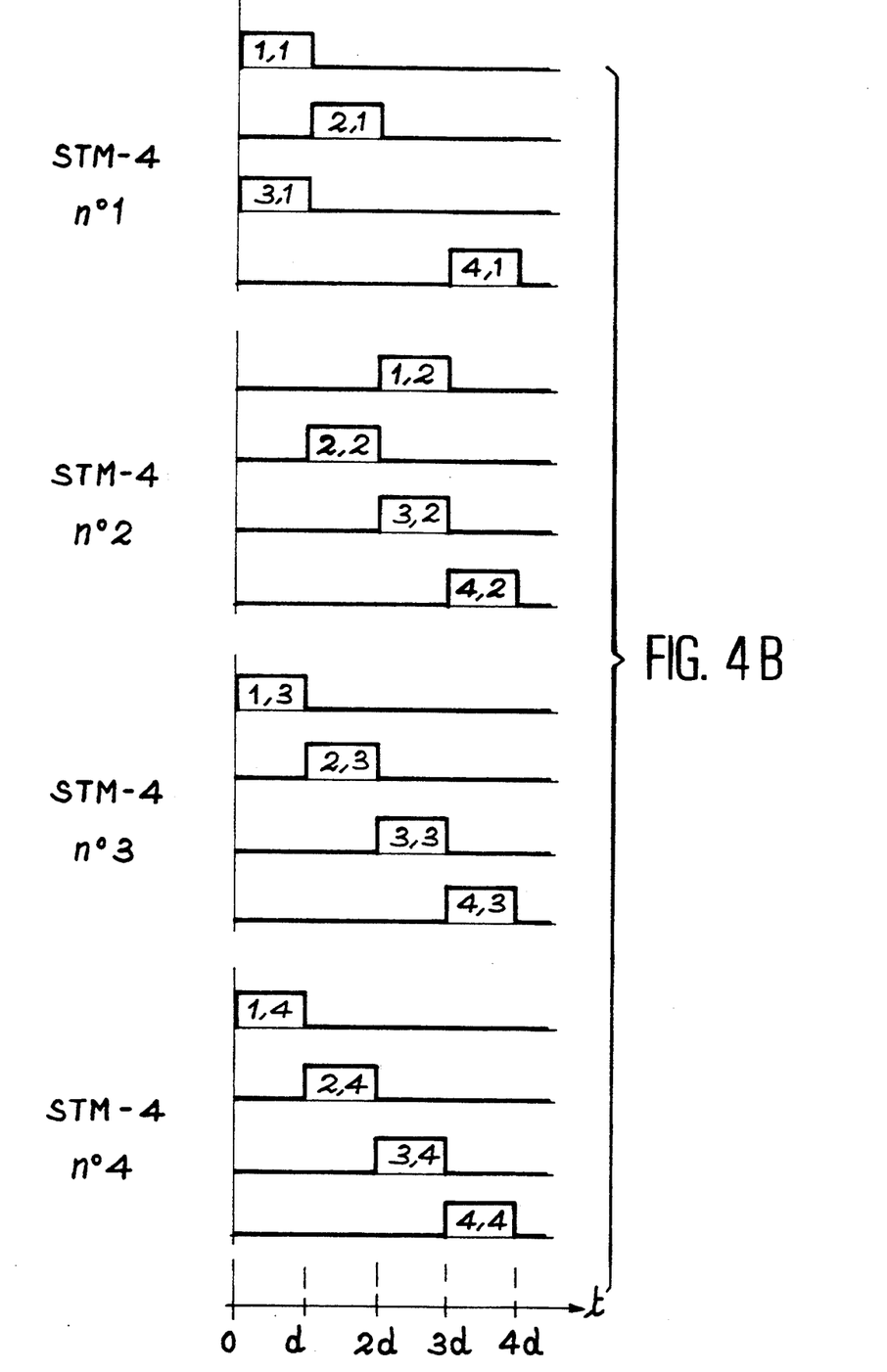
Figure 4C:
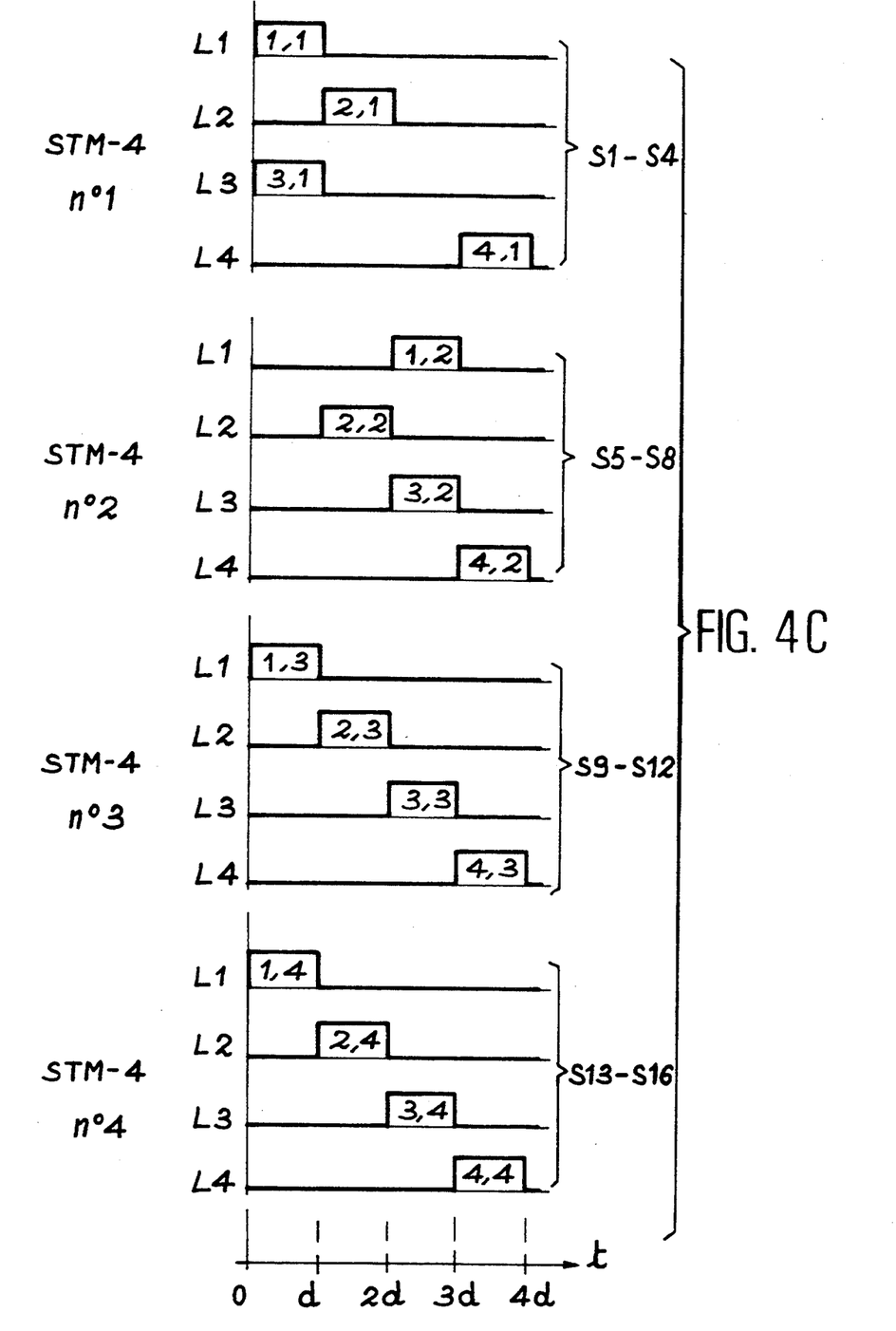

4A, 4B and 4C on which the notation (i, j), in which i assumes the values 1 to 4, and j also assumes the values 1 to 4, represents the STM-1 of rank i of the incident STM-4 of number j.

In order to explain this operation, it is assumed that it is wished to reverse the positions of the STM-1 of rank 3 in the first incident STM-4 and the STM-1 of rank 1 in the second incident STM-4. In other words, the STM-1 designated (3, 1) and (1, 2) are to be reversed.

FIG. 4A shows the time distribution of the STM-1 on the four output channels of each demultiplexer, the duration of each STM-1 still being designated d. After demultiplexing all the STM-1 are processed by the reorganization means controlled by the control means G.

It is pointed out that these control means G can impose a given output on a STM-1 in accordance with an external control (e.g. traffic distribution) or according to an internal operation devolving from the extraction of the address contained in the header of said STM-1.

In the chosen operational example, the reorganization means introduce an advance $2d$ on the third STM-1 of the STM-4 number 1 and a delay $2d$ on the first STM-1 of the second STM-4. This is illustrated by FIG. 4B, which shows the time distribution of the various STM-1 on the outputs of the reorganization means M1 to M4.

It is also pointed out that the STM-1 undergo a delay T linked with the calculation time of the control means G.

The thus reorganized signals are then converted into optical form by the converters EO1 to EO16 before reaching the corresponding optical coupler CO1 to CO4.

For each of these couplers, on the four outputs of the latter there are four optical signals at the four different wavelengths L1 to L4. This is illustrated by FIG. 4C, which shows these optical signals present on the outputs S1 to S16 of the couplers CO1 to CO4.

The spatial scrambling of the STM-1 is then ensured by the filters F1 to F16 controlled by the control means G and in this way it is possible to obtain on the outputs of the couplers CS1 to CS4 the new, desired STM-4.

In particular, the first output STM-4 is constituted by the following STM-1 in the indicated order:

(1, 1), (2, 1), (1, 2), (4, 1).

The second output STM-4 is constituted by the following STM-1 in the indicated order:

(3, 1), (2, 2), (3, 2), (4, 2).

This is obtained with the "positions" of the filters indicated in table I at the end of the present description and which are imposed by the control means G.

Thus, during the first time interval of amplitude d, the filter F1 permits the passage of the signal of wavelength L1 and all the other filters are inoperative, i.e. they do not permit the passage of any light. During the second time interval of amplitude d, the filter F1 allows the passage of the signal of wavelength L2 and all the other filters are inoperative. During the first time interval of amplitude d, filter F2 allows the passage of the signal of wavelength L3 and all the other filters are inoperative, etc.

It is pointed out that the various internal optical connections of the distributor of FIG. 4 can be obtained by using optical fibers.

It is also possible to envisage an integrated version of said distributor, in which the internal connections are constituted by integrated optical waveguides.

Figure 5:
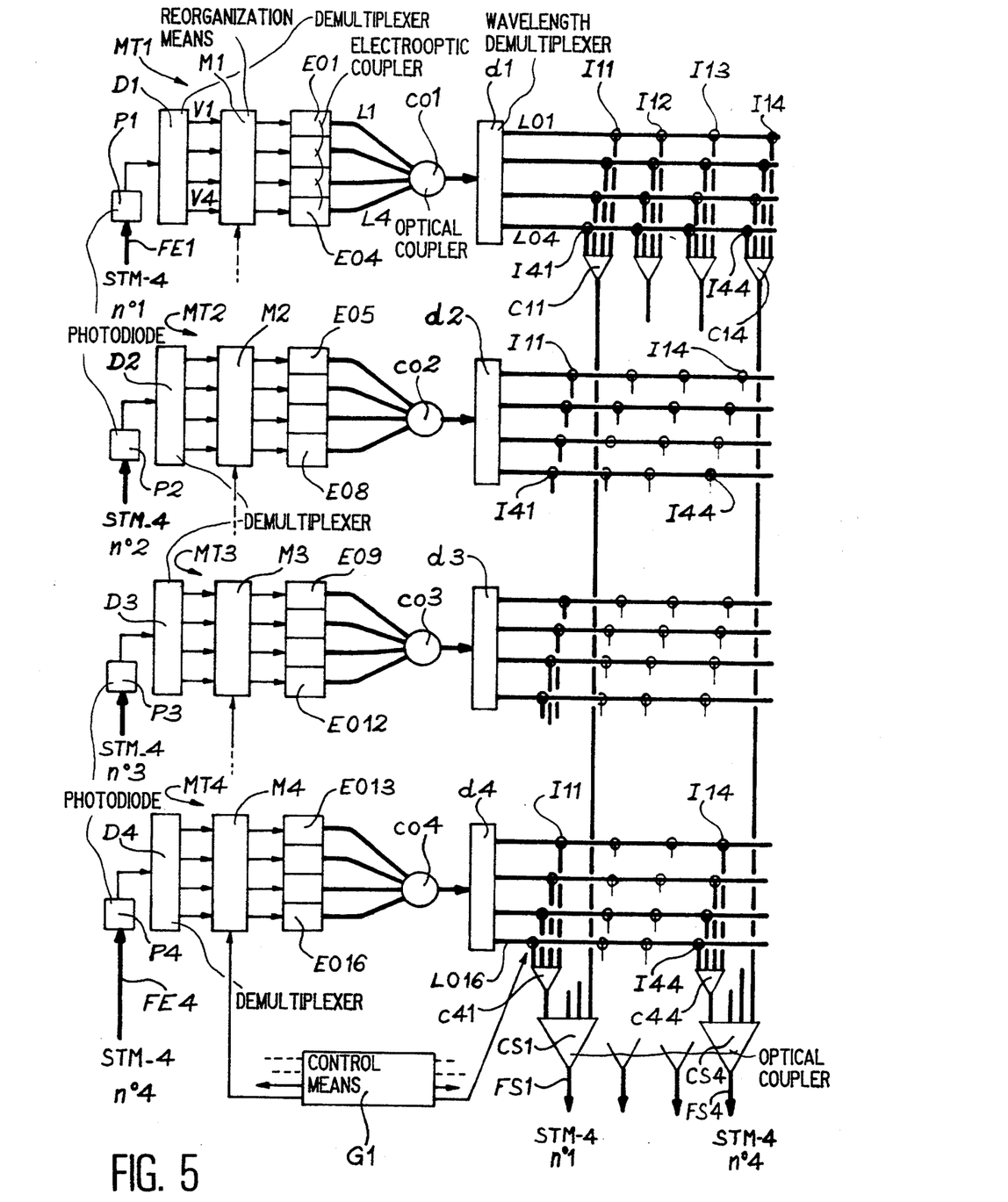
FIG. 5 show a diagrammatic view of another distributor according to the invention using optical switches.

FIG. 5 diagrammatically shows another optical distributor according to the invention. This optical distributor again comprises, as shown in FIG. 5, the optical fibers FE1 to FE4, the photodetectors P1 to P4, the demultiplexers D1 to D4, the reorganization means M1 to M4, the electrooptical converters EO1 to EO16, the output optical couplers CS1 to CS4 and the output optical fibres FS1 to FS4 referred to hereinbefore in connection with FIG. 3.

Moreover, the distributor of FIG. 5 comprises in each of its processing modules (MT1 to MT4) a wavelength demultiplexer (d1 to d4) having one input and four outputs and an optical coupler with four inputs and one output (co1 to co4).

The four inputs of said coupler are respectively connected to the outputs of the four corresponding electrooptical converters, while the output of said coupler is connected to the input of the corresponding wavelength demultiplexer.

The distributor of FIG. 5 also comprises, in each of its processing modules, an array of optical switches forming a matrix with four rows and four columns. Each optical switch constitutes an optical switching point and can be obtained by the technology of electrooptical modulators or that of optical amplifiers.

For each processing module, each optical switch carries the reference Iij, in which i is the index of the row and varies from 1 to 4 and j is the index of the column and also varies from 1 to 4, as can be seen in FIG. 5.

Moreover, and as can be seen in FIG. 5, each of the rows LO1 to LO16 is an optical line on which the corresponding switches are connected in series, said optical line being connected to an output of the corresponding wavelength demultiplexer.

For example, the optical switches I11, I12, I13 and I14 are connected in series on the same optical line, which is connected to the first output of the wavelength demultiplexer d1 belonging to the processing module MT1.

In addition, each processing module of the distributor of FIG. 5 comprises four optical couplers with four inputs and one output designated C11 to C14 for the module MT1, . . . , C41 to C44 for the module MT4. Each of these optical couplers is associated with a column of the corresponding optical switch matrix.

The four inputs of said optical coupler are respectively connected to the four optical switches of said column, while the output of the optical coupler is connected to an input of one of the output optical couplers CS1 to CS4: Cij thus representing the optical coupler corresponding to the processing module MTi ($1 \leq i \leq 4$) and to the output optical coupler CSj ($1 \leq j \leq 4$).

For example, the four inputs of the coupler CS1 are respectively connected to the outputs of the couplers C11, C21, C31 and C41 and the inputs of the coupler CS4 are respectively connected to the outputs of the coupler C14, C24, C34 and C44.

In the case of the distributor of FIG. 5, the control means G1 controls the reorganization means M1 to M4 and all the optical switches. When an optical switch is in the open state, it can be transversed by instant light. When it is in the closed state, said instant light is deflected to the input of the optical coupler having four inputs and one output and which is associated with said optical switch.

With regards to the operation of the distributor shown in FIG. 1, in each processing module is performed an electronic demultiplexing, a time rearrangement of the corresponding STM-1 and a transposition of the latter on four different wavelengths.

Then, the optical signals resulting from said transposition are pooled by the coupler having four inputs and a corresponding output, after which said optical signals reach the corresponding wavelength demultiplexer and are separated by the latter.

Thus, on the four outputs of said wavelength demultiplexer, there are respectively four signals of wavelengths L1 to L4.

Then, the spatial switching matrix constituted by the optical switches controlled by the control means G1 carries out the complete scrambling of the various STM-1.

Using the example given in the description of FIG. 3, for the transposition of the signals (1, 2) and (3, 1), it is necessary in the case of FIG. 5 to close the switches indicated in table II at the end of the present description.

Thus, during the first time interval of amplitude d, the switches which are closed are switches I11 and I32 for module MT1, switch I13 for module MT3 and switch I14 for module MT4, all the other switches remaining open.

During the second time interval of amplitude d, the switches which are closed are switch I21 for module MT1, switch I22 for module MT2, switch I23 for module MT3 and switch I24 for module MT4, all the other switches remaining open, etc.

The optical distributor of FIG. 5 can be produced in integrated optical technology on $LiNbO_3$ or on some other material such as InP, with switching based on an electrooptical, acoustooptical or similar effect.

In the distributor of FIG. 5, the optical couplers co1 to co4 and the wavelength demultiplexers d1 to d4 are not indispensible. They could be eliminated and then each electrooptical converter would be directly connected to the corresponding optical line. However, their use makes it possible to simplify the optical cabling of the distributor.

Both in the case of the distributor of FIG. 3 and that of FIG. 5, the rearranged signals STM-4 are transmitted by the optical fibers FS1 to FS4. However, the transmission of said signals may be disturbed by the chrometic dispersion of said optical fibers.

Figure 6:
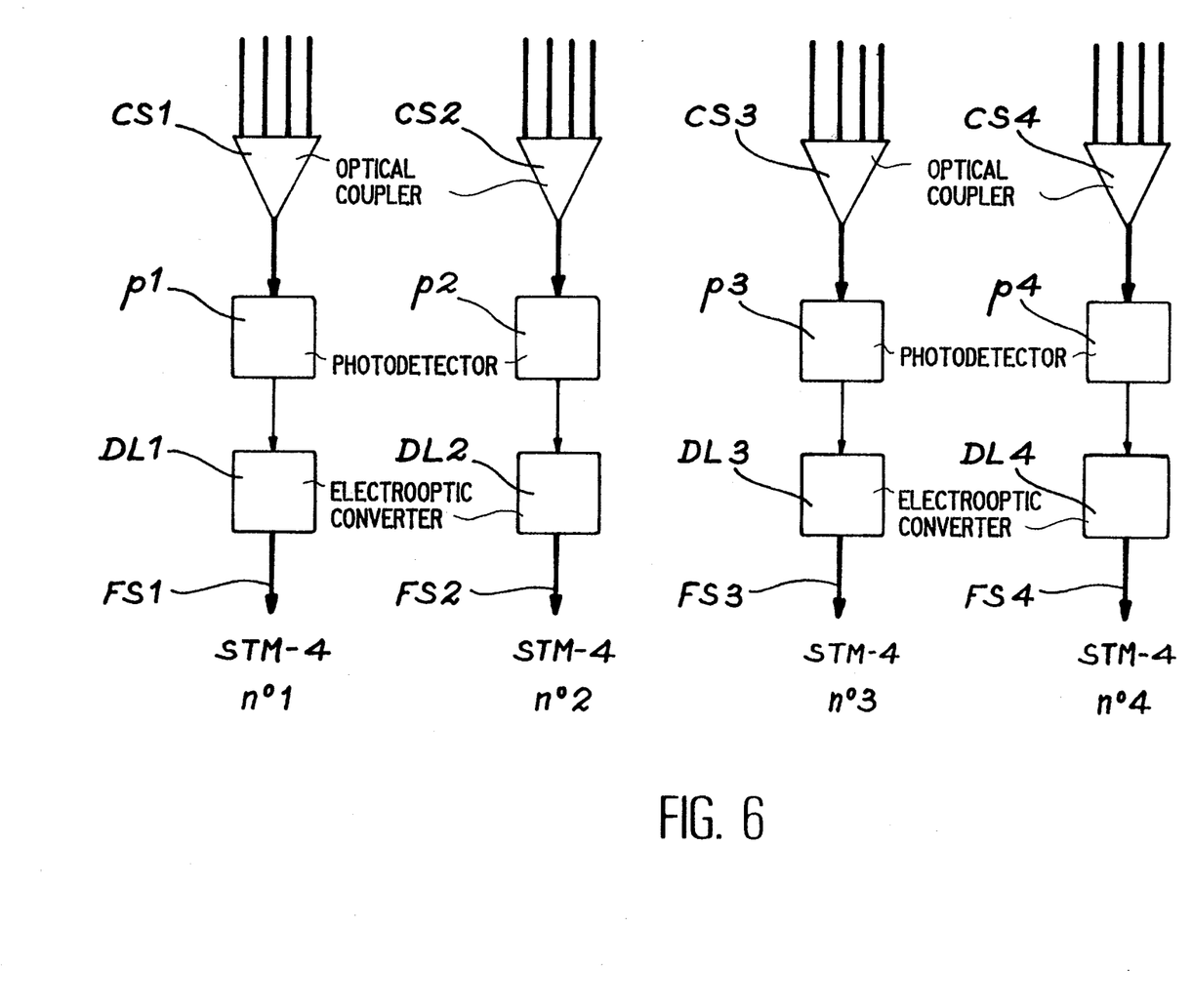
FIG. 6 show a diagrammatic, partial view of an optical distributor according to the invention, in which each output supplies signals of type STM-1 in optical form all having the same wavelength.

To obviate this disadvantage, it is possible to convert the optical signals supplied by each of the output optical couplers CS1 to CS4 into an electrical signal and again transform said electrical signal into an optical signal.

This is illustrated by FIG. 6, where the outputs of the couplers CS1 to CS4 are respectively connected to photodetectors p1 to p4 and the outputs of said photodetectors p1 to p4 are respectively connected to the inputs of the electrooptical converters DL1 to DL4 (which are e.g. laser diodes).

Thus, the output of each of the laser diodes which is connected to the corresponding output optical fiber, supplies a rearranged STM-4, whereof all the STM-1 are at the same wavelength.

Figure 7:
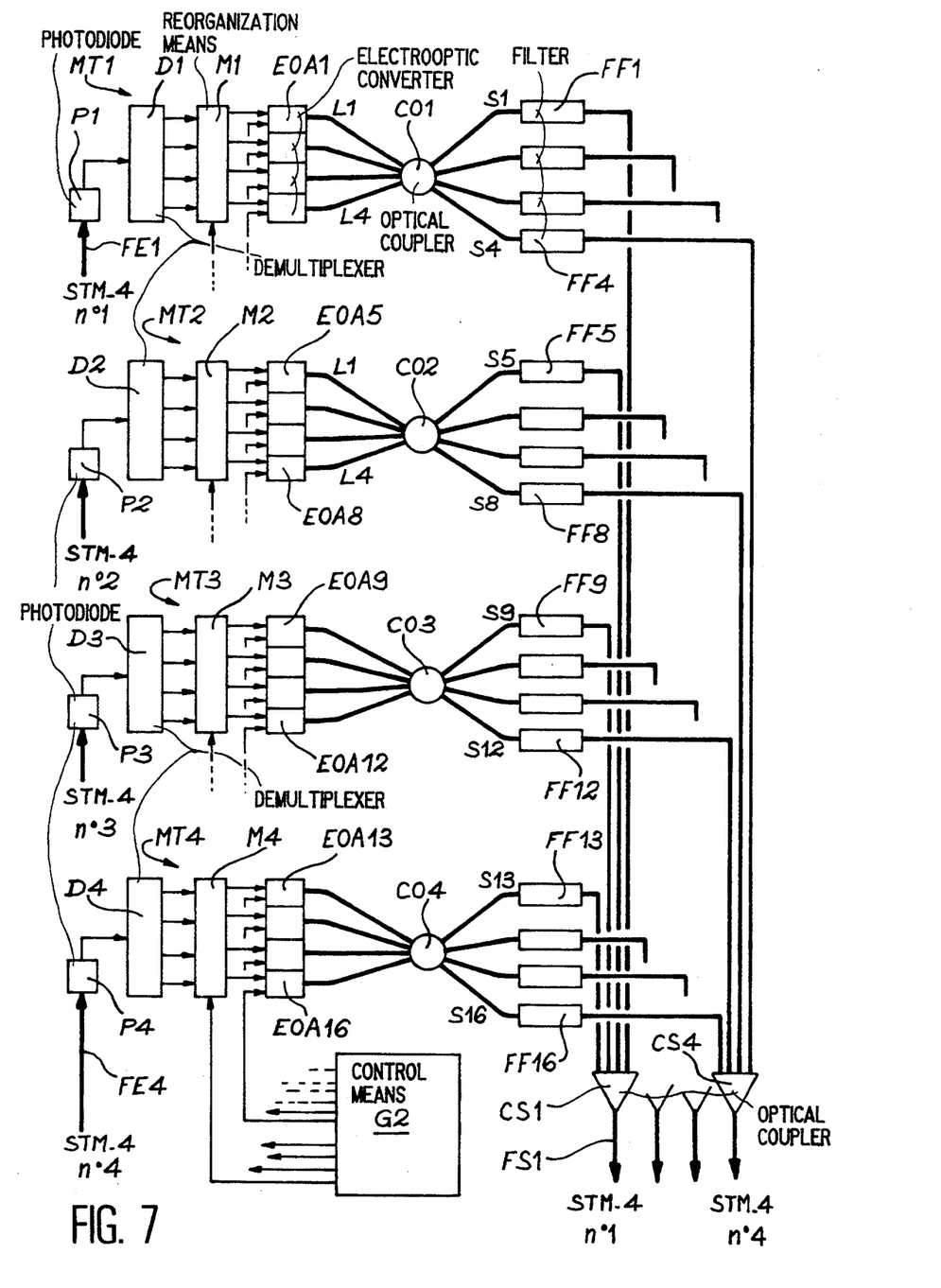
FIG. 7 show a diagrammatic view of another optical distributor according to the invention having tunable electrooptical converters.

Another optical distributor according to the invention is diagrammatically shown in FIG. 7. The distributor of FIG. 7 is identical to that of FIG. 3, except that in FIG. 7 the electrooptical converters EO1 to EO16, each of which emits an invariable wavelength, are replaced by turnable electrooptical converters EOA1 to EOA16 and the tunable filters F1 to F16 are replaced by filters FF1 to FF16, each of which only allows the passage of a single, predetermined wavelength.

Moreover, the control means G of FIG. 3 are replaced, in the distributor of FIG. 7, by control distributor of FIG. 7, it is possible to choose the wavelength corresponding to the final address, in order to obtain STM-1 of the same wavelength in each output STM-4.

It is therefore possible to directly emit information on a transmission line without suffering from the disadvantages due to chromatic dispersion.

In the distributor shown in FIG. 7
filters FF1, FF5, FF9 and FF13 only allow the passage of the wavelength L1,
filters FF2, FF6, FF10 and FF14 only allow the passage of the wavelength L2,
filters FF2, FF6, FF10 and FF14 only allow the passage of the wavelength L3 and
filters FF4, FF8, FF12 and FF16 only allow the passage of the wavelength L4.

Thus, the output STM-4 numbers 1, 2, 3 and 4 are respectively at the wavelengths L1, L2, L3 and L4.

On returning to FIG. 3, it should be noted that the availability of fast switching optical filters (approximately ins) makes it possible to produce a modular, high capacity optical distributor.

It is possible to produce a distributor, which reorganizes 256 frames STM-1 from 16 beams STM-16 by means of 16 wavelengths and 16 processing modules, each having 16 rapid switching, tunable optical filters.

An advantage of the distributor according to the invention is its modular structure, so that its capacity can be significantly increased by the addition of supplementary processing modules. If necessary, each output of the distributor according to the invention can be provided with an optical amplifier for amplifying the signals supplied by the corresponding output optical coupler.

The distributors according to the invention described relative to FIGS. 3, 5 and 7 receive at the input optical signals by means of fibers FE1 to FE4.

However, they could be used with electrical input signals, which would be directly supplied to the inputs of the demultiplexers D1 to D4 and the optical fibers FE1 to FE4 and the photodetectors P1 to P4 would then be eliminated.

Moreover, the present invention is not limited to the processing of synchronous transfer modules. It can also be used with elementary signals organized in packet form and transmitted in the asynchronous transfer mode.

In this case, each processing module simultaneously processes N consecutive packets of the packet flow reaching the input of said processing module. Thus, this input flow is broken down into arrays, each having N packets or modules, N being e.g. 4.

Then, each electronic demultiplexer counts N consecutive time intervals of amplitude d and carries out the demultiplexing of the packets present in the time interval of amplitude Nxd.

TABLE I

|          | STM-4 n°1 | STM-4 n°2 | STM-4 n°3 | STM-4 n°4 |
| --- | --- | --- | --- | --- |
| 0 to d   | F1:L1 | F2:L3 | F11:L1 | F16:L1 |
| d to 2d  | F1:L2 | F6:L2 | F11:L2 | F16:L2 |
| 2d to 3d | F5:L1 | F6:L3 | F11:L3 | F16:L3 |

TABLE I-continued

|  | STM-4 n°1 | STM-4 n°2 | STM-4 n°3 | STM-4 n°4 |
|---|---|---|---|---|
| 3d to 4d | F1:L4 | F6:L4 | F11:L4 | F16:L4 |

TABLE II

|  | MT1 | MT2 | MT3 | MT4 |
|---|---|---|---|---|
| 0 to d | I11, I32 |  | I13 | I14 |
| d to 2d | I21 | I22 | I23 | I24 |
| 2d to 3d |  | I11, I32 | I33 | I34 |
| 3d to 4d | I41 | I42 | I43 | I44 |

We claim:

1. Optical distributor, characterized in that it comprises:
    M inputs (FE1, FE2, FE3, FE4), M being an integer at least equal to 1, each input receiving elementary signals,
    M processing modules (MT1, MT2, MT3, MT4) respectively connected to the M inputs, each processing module having N outputs and simultaneously processing N consecutive elementary signals, N being an integer at least equal to 1,
    N outputs (FS1, FS2, FS3, FS4),
    N optical couplers (10; CS1, CS2, CS3, CS4), each having M inputs respectively associated with the M processing modules (MT1, MT2, MT3, MT4) and an output connected to one of the N outputs of the distributor and
    control means (6; G; G1; G2), which control the processing modules (MT1, MT2, MT3, MT4) and enable the distributor to scramble the elementary signals reaching the M inputs thereof, so that a given elementary signal reaches a given output of the distributor, and in that each processing module (MT1, MT2, MT3, MT4):
    electronically demultiplexes the N consecutive elementary signals and thus supplies, in electrical form, N demultiplexed elementary signals,
    under the control of the control means (6; G; G1, G2) rearranges on a time basis said N demultiplexed signals in accordance with the output of the distributor imposed by the control means (6; G; G1; G2) for each of said N demultiplexed signals and
    also under the control of the control means (6; G; G1; G2), transposes the N demultiplexed signals in optical form at N wavelengths (L1, L2, L3, L4) differing from one another and switches each transposed signal to the desired output of the distributor.

2. Distributor according to claim 1, characterized in that said each said processing module (MT1, MT2, MT3, MT4) comprises:
    electronic demultiplexing means (2; D1, D2, D3, D4) having one input connected to the input of the distributor, which corresponds to said processing module, and N outputs, said demultiplexing means (2; D1, D2, D3, D4) supplying respectively at their N outputs the N demultiplexed signals,
    reorganization means (4; M1, M2, M3, M4) with N inputs respectively connected to the N outputs of the demultiplexing means (2; D1, D2, D3, D4), and with N outputs, said reorganization means being controlled by the control means and reorganizing on a time basis the N demultiplexed signals,
    N electrooptical converters (eo1 to eo4; EO1 to EO4, EO5 to EO8, EO9 to EO12, EO13 to EO16) whose inputs respectively receive the N time reorganized signals and which respectively supply N optical signals, whose respective wavelengths (L1, L2, L3, L4) differ from one another and
    switching means (8, f1 to f4; CO1 to CO4, F1 to F16; co1 to co4, d1 to d4, I11 to I44, c11 to c44) which are controlled by the control means (6; G; G1) and which switch each optical signal to the desired output of the distributor.

3. Distributor according to claim 2, characterized in that the switching means comprise:
    an intermediate optical coupler (8; CO1 to CO4) with N inputs, which respectively receive the N optical signals, and with N outputs and
    N tunable optical filters (f1 to f4; F1 to F4, F5 to F8, F9 to F12, F13 to F16), which are controlled by the control means (6; G), whose inputs are respectively connected to the outputs of the intermediate optical coupler and whose N outputs are respectively connected to the N inputs respectively belonging to the N optical output couplers, (10; CS1 to CS4) so that each processed elementary signal is switched to one of the outputs of the distributor.

4. Distributor according to claim 2, characterized in that the switching means comprise:
    an array of N×N optical switches (I11 to I44), which are controlled by control means (G1) and which form N rows and N columns, each row having N of said series-connected optical switches and forming an optical line connected to the output of one of the electrooptical converters (EO1 to EO16) and
    N auxiliary optical couplers (c11 to c14, (...), c41 to c44) with N inputs and one output, the N inputs of each auxiliary optical coupler being respectively connected to the N optical switches of one of the N columns and the output of said auxiliary optical coupler being connected to one of the inputs of one of the output optical couplers of the distributor.

5. Distributor according to claim 4, characterized in that the switching means also comprise:
    an intermediate optical coupler (co1 to co4) with N inputs, which respectively receive the N optical signals from the electrooptical converters (EO1 to EO4), and one output and
    a wavelength demultiplexer (d1 to d4) with one input connected to the output of said intermediate optical coupler, and N outputs respectively connected to the N optical lines of the array of optical switches (I11 to I44).

6. Distributor according to claim 2, characterized in that it also comprises
    N photodetectors (p1, p2, p3, p4), whose inputs are respectively connected to the outputs of the output optical couplers of the distributor (CS1, CS2, CS3, CS4) and
    N auxiliary electrooptical converters (DL1, DL2, DL3, DL4), whose inputs are respectively connected to the outputs of the N photodetectors (p1, p2, p3, p4), the N outputs (FS1, FS2, FS3, FS4) of the distributor being respectively connected to the outputs of said N auxiliary electrooptical converters, so that each output of the distributor supplies elementary signals, which are in optical form and have the same wavelength.

7. Distributor according to claim 1, characterized in that said each processing module (MT1 to MT4) comprises:

electronic demultiplexing means (D1 to D4) having one input connected to the input of the distributor corresponding to said each processing module, and N outputs, said demultiplexing means supplying respectively at their N outputs the N demultiplexed signals, reorganization means (M1 to M4) having N inputs respectively connected to the N outputs of the demultiplexing means, and with N outputs, said reorganization means being controlled by the control means (G2) and time reorganizing the N demultiplexed signals, N tunable electrooptical converters (EOA1 to EOA4, EOA5 to EOA8, EOA9 to EOA12, EOA13 to EOA16) whose inputs respectively receive the N time reorganized signals, which respectively supply N optical signals and which are controlled by the control means (G2), an intermediate optical coupler (CO1 to CO4) with N inputs, which respectively receive the N optical signals, and N outputs and N optical filters (FF1 to FF4, FF5 to FF8, FF9 to FF12, FF13 to FF16), whose inputs are respectively connected to the outputs of the intermediate optical coupler (CO1 to CO4), whose N outputs are respectively connected to the N inputs respectively belonging to the N output optical couplers (CS1 to CS4), and each of said N optical filters only allowing the passage of a single wavelength, the N wavelengths (L1, L2, L3, L4) which are respectively allowed by said filters differing from one another, each processed elementary signal being in this way switched to one of the N outputs of the distributor.

8. Distributor according to claim 1, characterized in that said each input (FE1, FE2, FE3, FE4) of said distributor receives elementary signals in optical form and is connected to the input of a photodetector (P1, P2, P3, P4), whose output is connected to the input of the corresponding processing module (MT1, MT2, MT3, MT4) in order to supply the latter with elementary signals in electrical form.

9. Distributor according to claim 1, characterized in that said each input (FE1, FE2, FE3, FE4) of the distributor receives signals, which are order N synchronous transfer modules each processing module (MT1, MT2, MT3, MT4) simultaneously processing the N order 1 synchronous transfer modules of each of said order N synchronous transfer modules.

10. Distributor according to claim 1, characterized in that said each input (FE1, FE2, FE3, FE4) of the distributor receives elementary signals organized in packet form and transmitted in the asynchronous transfer mode, each processing module (MT1, MT2, MT3, MT4) simultaneously processing N consecutive packets.

11. An optical distributor, comprising:
M inputs, M being an integer at least equal to 1, each input receiving elementary signals;
M processing modules respectively connected to the M inputs, each processing module having N outputs and simultaneously processing N consecutive elementary signals, N being an integer at least equal to 1;
N outputs;
N optical couplers, each having M inputs respectively associated with the M processing modules and an output connected to one of the N outputs of the distributor; and
control means for controlling the processing modules to scramble the N consecutive elementary signals reaching the M inputs thereof, so that a given elementary signal reaches a given of the N outputs of the distributor;
wherein each processing module:
electronically demultiplexes the N consecutive elementary signals and thus supplies, in electrical form, N demultiplexed elementary signals,
rearranges on a time basis under control of the control means said N demultiplexed signals in accordance with the output of the distributor imposed by the control means for each of said N demultiplexed signals and transposes the N demultiplexed signals in optical form at N different wavelengths from one another and switches each transposed signal to a desired of the N outputs of the distributor.

12. The distributor according to claim 11, wherein said each processing module, comprises:
electronic demultiplexing means, having one input connected to the input of the distributor, which corresponds to said processing module, and N outputs, said demultiplexing means supplying respectively at their N outputs the N demultiplexed signals;
reorganization means with N inputs respectively connected to the N outputs of the demultiplexing means, and with N outputs, said reorganization means being controlled by the control means and reorganizing on a time basis the N demultiplexed signals;
N electrooptical converters whose inputs respectively receive the N time reorganized signals and which respectively supply N optical signals, whose respective wavelengths differ from one another; and
switching means controlled by the control means and which switch each optical signal to the desired of the N outputs of the distributor.

13. The distributor according to claim 12, wherein the switching means comprise:
an intermediate optical coupler with N inputs, which respectively receive the N optical signals, and with N outputs; and
N tunable optical filters which are controlled by the control means and having inputs respectively connected to the outputs of the intermediate optical coupler and having N outputs respectively connected to the N inputs respectively belonging to the N optical output couplers, so that each processed elementary signal is switched to one of the N outputs of the distributor.

14. The distributor according to claim 12, wherein the switching means comprise:
an array of N×N optical switches controlled by the control means and which form N rows and N columns, each row having N of said series-connected optical switches and forming an optical line connected to the output of one of the electrooptical converters;
N auxiliary optical couplers, with N inputs and one output, the N inputs of each auxiliary optical coupler being respectively connected to the N optical switches of one of the N columns and the output of said auxiliary optical coupler being connected to one of the inputs of one of the output optical couplers of the distributor.

15. The distributor according to claim 14, wherein the switching means further comprise:
an intermediate optical coupler with N inputs, which respectively receive the N optical signals from the electrooptical converters, and one output; and
a wavelength demultiplexer with one input connected to the output of said intermediate optical coupler, and N outputs respectively connected to the N optical lines of the array of optical switches.

16. The distributor according to claim 12, further comprising:
N photodetectors having inputs respectively connected to the outputs of the output optical couplers of the distributor; and
N auxiliary electrooptical converters having inputs respectively connected to the outputs of the N photodetectors, the N outputs of the distributor being respectively connected to the outputs of said N auxiliary electrooptical converters, wherein each output of the distributor supplies elementary signals which are in optical form and have the same wavelength.

17. The distributor according to claim 11, wherein said each processing module comprises:
electronic demultiplexing means having one input connected to the input of the distributor corresponding to said each processing module, and N outputs, said electronic demultiplexing means supplying respectively at their N outputs the N demultiplexed signals;
reorganization means having N inputs respectively connected to the N outputs of the electronic demultiplexing means, and with N outputs, said reorganization means being controlled by the control means and time reorganizing the N demultiplexed signals;
N tunable electrooptical converters whose inputs respectively receive the N time reorganized signals, which respectively supply N optical signals and which are controlled by the control means;
an intermediate optical coupler with N inputs, which respectively receive the N optical signals, and with N outputs; and
N optical filters, whose inputs are respectively connected to the outputs of the intermediate optical coupler and having N outputs respectively connected to the N inputs respectively belonging to the N output optical couplers and each of said N optical filters only allowing passage of a single wavelength, the N wavelengths which are respectively allowed by said filters differing from one another, each processed elementary signal being in this way switched to one of the N outputs of the distributor.

18. The distributor according to claim 11, wherein said each input of said distributor receives elementary signals in optical form and is connected to an input of a photodetector having an output connected to the input of the corresponding processing module in order to supply the latter with elementary signals in electrical form.

19. The distributor according to claim 11, wherein said each input of the distributor receives signals, which are order N synchronous transfer modules, each processing module simultaneously processing the N order 1 synchronous transfer modules of each of said order N synchronous transfer modules.

20. The distributor according to claim 11, wherein said each input of the distributor receives elementary signals organized in packet form and transmitted in the asynchronous transfer mode, each processing module simultaneously processing N consecutive packets.

* * * * *